Dec. 1, 1964 S. SAM 3,159,191
ADJUSTABLE WOBBLE DADO ASSEMBLY
Filed Jan. 2, 1962 2 Sheets-Sheet 1

INVENTOR
SAMUEL SAM
BY
Fetherstonhaugh & Co.
ATTORNEYS

Dec. 1, 1964  S. SAM  3,159,191
ADJUSTABLE WOBBLE DADO ASSEMBLY
Filed Jan. 2, 1962  2 Sheets-Sheet 2

INVENTOR
SAMUEL SAM
BY Fetherstonhaughs
ATTORNEYS

United States Patent Office 3,159,191
Patented Dec. 1, 1964

3,159,191
ADJUSTABLE WOBBLE DADO ASSEMBLY
Samuel Sam, 911 Beckwith Road, Richmond,
British Columbia, Canada
Filed Jan. 2, 1962, Ser. No. 163,933
5 Claims. (Cl. 144—238)

This invention relates to an adjustable wobble dado assembly for cutting grooves of various widths in a workpiece.

An object of the invention is to provide a dado assembly which is adjustable to cut grooves of various widths and which provides a large range of adjustment for a given diameter cutting blade.

A further object of the invention is to provide a dado assembly which requires a minimum of forming operation in its manufacture, enabling harder and more durable materials to be used in its construction.

Another object of the invention is to provide a dado assembly in which the dado cutter can be simply and quickly adjusted to make cuts of different widths, there being no necessity to remove the dado from its associated arbor or shaft to effect the adjustment.

A still further object of the present invention is to provide a dado assembly which is provided with means for quickly and positively adjusting the angularity of the cutter blade relative to the arbor or shaft on which the dado assembly is mounted, thereby to cut a groove of any desired width within the range of the dado cutter.

A still further object of the invention is to provide a dado assembly which has excellent dynamic balance thereby substantially eliminating undesirable vibration at high speed of operation.

In accordance with these objects, the present invention contemplates the provision of a dado assembly comprising a cutter blade assembly, said cutter blade assembly including a blade having an aperture formed centrally thereof, said blade having a plurality of cutting bits mounted thereon and projecting beyond the periphery thereof, a pair of clamping plates formed with an aperture centrally thereof, complementary inclined inner surfaces, central hub portions projecting towards each other through the central aperture of said blade, and means engaging said blades and said clamping plates to prevent relative movement therebetween; a spool assembly formed with a hollow central spindle for receiving a shaft connected to driving means for the dado assembly, and having end plates formed with complementary inclined inner surfaces, said cutter blade assembly being mounted on said spindle between the inclined inner surfaces of said spool for rotation relative to said spool whereby the plane of the cutter blade and projecting bits may be adjusted to a predetermined angularity relative to a plane extending perpendicular to the axis of rotation of the dado assembly; and means for releasably clamping the cutter blade assembly between the end plates of said spool to prevent rotation of said cutter blade assembly relative to said spool assembly.

Other features which may be included in accordance with the invention will be described hereinafter and referred to in the appended claims.

In an example of the invention shown in the accompanying drawings.

Figure 1:
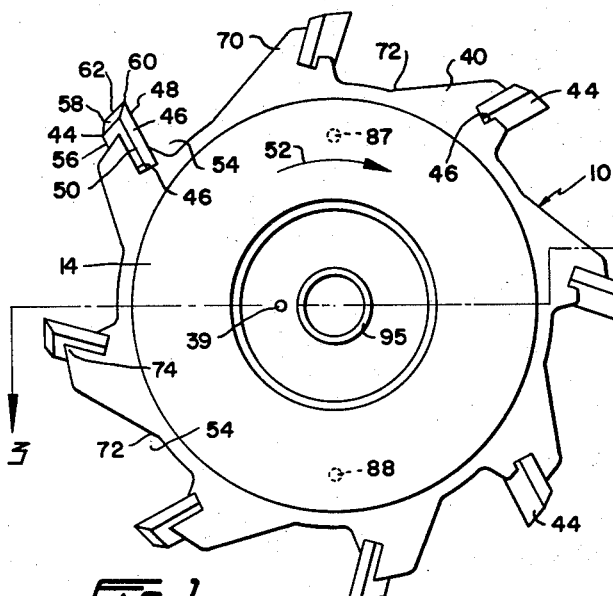
FIGURE 1 is a side elevation of a dado assembly according to the invention.

Referring to the drawings, the wobble dado assembly generally designated 10, includes a spool assembly and a cutter blade assembly mounted on the spool assembly.

The spool assembly includes a pair of end plates 12 and 14, each formed with an opening centrally thereof and having complementary inclined surfaces 18 and 20. Each of the end plates 12 and 14 is provided with a central hub portion. Hub portion 22 is integrally formed with end plate 12 and has an inclined inner surface 24 lying in a plane parallel to and spaced from the inner inclined surface 18 of end plate 12. A circular recess 26, the bottom of which lies in a plane parallel to the outer surface of end plate 12, is formed in the inclined surface 24 of hub portion 22 centrally thereof. Hub portion 28 integrally formed with end plate 14 consists of two sections 30 and 31, the innermost section or spigot 31 being of reduced diameter and having an inner surface parallel to the outer surface of end plate 14. Hub section 30 has an inner inclined surface 33 parallel to but spaced from inclined surface 24 of hub portion 22 to form a space 34 therebetween. Hub section 31 is adapted to fit snugly within the recess 26 in hub portion 22, but spaced from the bottom of said recess, upon assembly of the spool. The two end plates 12 and 14 are held together with the thickest portion of one end plate angularly positioned opposite the thinnest portion of the other end plate by means of a pin 39 which is fixed to one plate and slidably fits in a hole drilled in the other plate.

Figure 2:
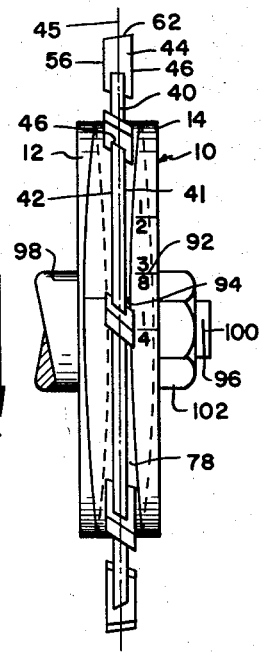
FIGURE 2 is an edge view of the dado assembly mounted on an arbor or shaft.
Figure 3:
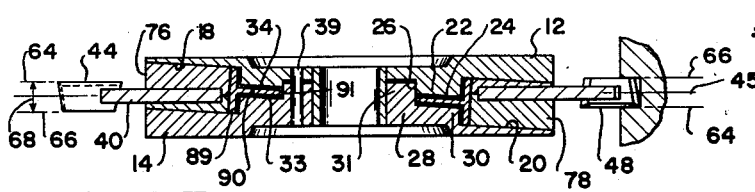
FIGURE 3 is a section through the dado assembly taken on line 3—3 of FIGURE 2 and with the assembly set to cut a groove of the minimum width within the range of the dado assembly.

The cutter blade assembly includes a rigid flat blade 40 formed of suitable steel and having a large circular opening centrally thereof. A plurality of cutting bits 44 are secured to and project outwardly from the periphery of blade 40. The cutting bits 44 are accommodated in recesses 46 formed in the edge of blade 40 and opening outwardly therefrom, the bits 44 being secured to the blade in any suitable manner as, for example, by silver welding. Each cutting bit 44 extends across the general plane 45 of the blade at an angle thereto as best seen in FIGURES 2 and 3, and has a side 46 projecting from a face of the blade, with a leading cutting edge 48 on said side and overlapping the adjacent blade face, as indicated at 50 in FIGURE 1. The bits 44 lean forwardly in the direction of rotation of the blade, indicated by arrow 52, to form a gullet 54 immediately ahead of each bit. Although the side 56 of the bits opposite side 46 may be flush with the adjacent face of the blade 40, it is preferably to have them project laterally from said face as shown, and these sides overlap the latter face.

The outer ends 58 of the bits 44 are flat and inclined inwardly towards the blade 40 from points 60 at the outer end of the leading cutting edge 48 of said bits. This forms a transverse outer cutting edge 62 extending across the plane of the blade at an angle thereto, this cutting edge 62 actually extends rearwardly from point 60 relative to the direction of rotation of the blade.

Referring to FIGURE 1 it will be noted that the sides 46 of some of the bits 44 overlap face 41 of the blade, whilst the sides 46 of the remaining bits overlap the other face 42. This places some of the leading cutting edges 48 and points 60 of the bits on one side of the blade and the remainder on the opposite side thereof. In other words, some of the bits act as left hand cutter and the remainder as right hand cutters. All the cutting edges 48 on one side of the blade are located in a common plane 64 that is parallel with the plane of the blade, while all the leading cutting edges on the opposite side of the blade are in a common plane 66 parallel with the first common plane and the plane of the blade. The distance 68 between planes 64 and 66 (see FIGURE 3) represents the width of the narrowest cut that can be made by this tool, and this distance is equal to the effective width of the bits relative to the cutting blade.

The actual edge of blade 40 is formed with an abutment 70 behind each of the bits 44. Each abutment starts at 72 near the inner end of one bit at the bottom of the gullet 54 thereof and extends outwardly to a point 74 near the outer end of the next bit in a forward direction having regard to the direction of rotation of the blade. Each abutment backs up the bit 44 at its end 74 so that said bit may be made of a material, such as tungsten carbide, that is very satisfactory for cutting purposes, but which is very brittle. As the bits project laterally beyond the faces of the cutting blade, said blade may extend into grooves being cut by the tool.

The blade 40 of the cutter blade assembly is adapted to be held between a pair of wedge-shaped clamping plates 76 and 78. These clamping plates 76 and 78 are each provided with a large central aperture and having complementary inclined inner surfaces 80 and 81, and outer surfaces 82 and 83 that are parallel to each other but not to said surfaces 80 and 81. The clamping plates also have shallow central hub portions 84 and 86 respectively which project towards each other through the central aperture of blade 40 and form a circular shoulder which engages the central aperture of blade 40 to provide a bearing therefor. The thickest portion of one of the clamping blades is angularly positioned opposite the thinnest portion of the other clamping plate and the two plates are secured together in this position with their inclined surfaces disposed on opposite sides of blades 40 by means of pins 87 and 88 which engage suitable holes drilled through blade 40 and plates 76 and 78.

A cylinder sleeve member 89 fits snugly in the aligned apertures of clamping plates 76 and 78, and has an annular internal flange 90 medially thereof and projecting freely into space 34 between hub surfaces 22 and 33. This flange has a rounded inner edge 91 that engages hub section 31 so that said flange properly spaces the cutter blade assembly from said hub section.

In assembling the dado assembly, the sleeve 89 is fitted within the central aperture of the cutter blade assembly to become part of said assembly. Then the blade assembly is dropped on to end plate 14 with hub portion 30 positioned within and clear of sleeve 89, and hub portion 31 fitting within flange 90, at which time the blade assembly is properly spaced from said hub portion 31. The dado assembly is completed by placing end plate 12 over the cutter blade assembly with hub portion 22 freely fitting within sleeve 89 and recess 26 fitting over spigot 31. Suitable bushings 95 removably insertable within the central bore of the dado assembly enable the dado to be mounted on arbors or shafts of various diameters.

Figure 4:
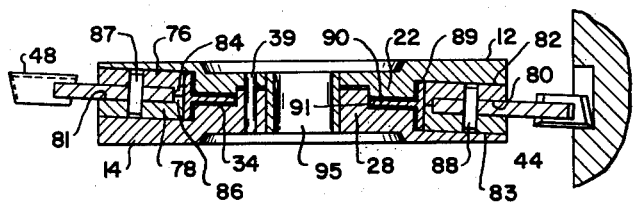
FIGURE 4 is a view similar to FIGURE 3 with the dado assembly set to cut a groove of a different width.
Figure 5:
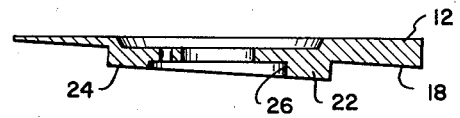
FIGURE 5 is a section similar to FIGURE 3 with parts of the assembly omitted for the sake of clarity.
Figure 6:
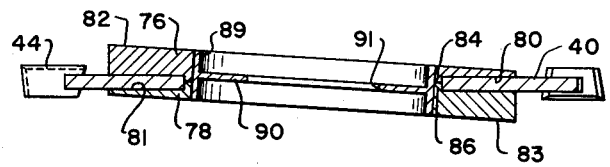
FIGURE 6 is a section similar to FIGURE 3 through part of the assembly omitted from FIGURE 5.
Figure 7:
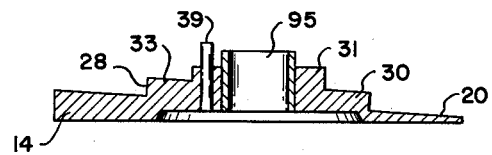
FIGURE 7 is a section through part of the assembly omitted from FIGURES 5 and 6.

With the dado assembled in this manner, the cutter blade assembly is rotatable relative to the spool and it will be seen that relative rotation between the cutter blade assembly and the spool assembly is effective to vary the plane of inclination of the cutting blade 40 and, consequently, of the cutting bits 44. The dado assembly can thus be adjusted to vary the width of the cuts made by the dado. FIGURE 3 shows the unit set for a minimum width groove, while FIGURE 4 shows the cutter blade assembly turned a quarter turn for a groove of a width about half way between the narrowest and the widest grooves obtainable with this dado assembly.

To facilitate setting of the dado assembly, graduations 92 may be provided on the periphery of one of the end plates, for example, end plate 14, to enable the assembly to be set to cut grooves of selected widths. These graduations co-operate with a marker 94 on one of the clamping plates, for example, clamping plate 78 as shown in FIGURE 2.

In use, as shown particularly in FIGURE 2, the dado assembly is mounted on the reduced portion 96 of a shaft or arbor 98 adapted to be driven in any suitable manner. The outer end of reduced portion 96 is threaded as at 100 to receive a nut 102, and with the nut 102 tightened on the shaft, the end plates 12 and 14 of the spool assembly are clamped tightly about the cutter blade assembly, and the whole dado assembly is secured to the shaft for rotation therewith. The inclined inner surfaces 18 and 20 bear against the parallel outer surfaces 82 and 83 of the plates 76 and 78 at this time firmly to hold the blade assembly in the position to which it is set in the dado assembly. When it is desired to vary the cutting widths, it is merely necessary to loosen nut 102 and rotate the blade assembly relative to the spool assembly to the desired position and thereafter tighten nut 102 on the shaft.

What I claim as my invention is:

1. A wobble dado assembly comprising a cutter blade assembly, said cutter blade assembly including a blade having flat opposite faces and a large aperture formed centrally thereof, a pair of clamping plates formed with an aperture centrally thereof and having parallel outer surfaces and complementary inner surfaces inclined relative to said outer surfaces, said plates being positioned on opposite sides of the blade with their inner surfaces against said blade faces, and means engaging the blade and the clamping plates to prevent relative movement therebetween; a spool assembly including end plates having parallel outer surfaces and complementary inner surfaces inclined relative to said end plate outer surfaces and bearing against the parallel outer surfaces of the clamping plates, hub portions on said end plates and extending towards each other within the apertures of the clamping plates and radially spaced from said clamping plates and having complementary inclined inner ends parallel with the inclined inner surfaces of said end plates, the inclined inner ends of the hub portions being spaced from each other, means maintaining the hub portions radially from the clamping plates, a bore extending through the hub portions adapted to receive a shaft, and means engaging the end plates to prevent relative rotation thereof; said cutter blade assembly being mounted on said hub portions between the inclined inner surfaces of said spool end plates for rotation relative to said spool, whereby the cutter blade may be adjusted to a predetermined angularity relative to a plane extending perpendicular to the axis of said bore, said end plates of the spool being adapted to be clamped against the cutter blade assembly to hold the latter in a desired position relative to said spool.

2. A wobble dado assembly as claimed in claim 1 in which one of the hub portions is formed with a boss projecting therefrom and fitting in a corresponding recess formed in the other hub portion, said boss having an outer end and said recess having a bottom parallel with outer faces of the end plates of the spool assembly.

3. A wobble dado assembly as claimed in claim 1 in which the clamping plates are formed with central hub portions projecting towards each other, one of said last-mentioned hub portions extending into the central aperture of the blade to position said blade relative to the clamping plates.

4. A wobble dado assembly as claimed in claim 3 in which one of the end plate hub portions is formed with a boss projecting therefrom and fitting in a corresponding recess formed in the other end plate hub portion, said boss having an outer end and said recess having a bottom parallel with outer faces of the end plates of the spool assembly.

5. A wobble dado assembly as claimed in claim 4 including a sleeve fitting within the hub portions of the clamping plates, and a medial internal annular flange on said sleeve and extending between the spaced-apart inner ends of the end plate hub portions and engaging said boss to position the cutter blade assembly within the end plates.

References Cited in the file of this patent
UNITED STATES PATENTS

| | | |
|---|---|---|
| 45,677 | Rogers | Dec. 27, 1864 |
| 154,808 | Seymour | Sept. 8, 1874 |
| 261,680 | Cook | July 25, 1882 |
| 1,568,199 | Watson | Jan. 5, 1926 |
| 2,544,814 | Warren | Mar. 13, 1951 |
| 2,665,722 | Edgemond | Jan. 12, 1954 |
| 2,683,476 | Courcier | July 13, 1954 |
| 2,922,449 | Sam | Jan. 26, 1960 |